US007293136B1

(12) United States Patent
More et al.

(10) Patent No.: US 7,293,136 B1
(45) Date of Patent: Nov. 6, 2007

(54) MANAGEMENT OF TWO-QUEUE REQUEST STRUCTURE FOR QUALITY OF SERVICE IN DISK STORAGE SYSTEMS

(75) Inventors: Sachin Suresh More, Westborough, MA (US); Adnan Sahin, N. Chemsford, MA (US); William J. Glynn, Sherborn, MA (US)

(73) Assignee: EMC Corporation, Hopkinton, MA (US)

( * ) Notice: Subject to any disclaimer, the term of this patent is extended or adjusted under 35 U.S.C. 154(b) by 273 days.

(21) Appl. No.: 11/208,291

(22) Filed: Aug. 19, 2005

(51) Int. Cl.
*G06F 12/00* (2006.01)

(52) U.S. Cl. .......................... 711/112; 711/158; 710/40

(58) Field of Classification Search ................ 711/112; 710/40
See application file for complete search history.

(56) References Cited

U.S. PATENT DOCUMENTS

| | | | | |
|---|---|---|---|---|
| 5,165,021 | A * | 11/1992 | Wu et al. | 709/234 |
| 5,220,653 | A | 6/1993 | Miro | 718/107 |
| 5,469,560 | A | 11/1995 | Beglin | 711/112 |
| 5,603,063 | A | 2/1997 | Au | 710/52 |
| 5,832,304 | A * | 11/1998 | Bauman et al. | 710/40 |
| 6,141,707 | A | 10/2000 | Halligan et al. | 710/36 |
| 6,170,042 | B1 | 1/2001 | Gaertner | 711/58 |
| 6,311,256 | B2 | 10/2001 | Halligan et al. | 711/158 |
| 6,378,036 | B2 | 4/2002 | Lerman et al. | 711/112 |
| 6,487,562 | B1 | 11/2002 | Mason, Jr. et al. | 702/205 |
| 6,665,740 | B1 | 12/2003 | Mason, Jr. et al. | 710/6 |
| 6,721,789 | B1 | 4/2004 | DeMoney | 709/219 |
| 6,754,897 | B1 | 6/2004 | Ofer et al. | 718/103 |
| 6,839,817 | B2 | 1/2005 | Hyde, II et al. | 711/154 |
| 6,871,011 | B1 | 3/2005 | Rahman et al. | 386/125 |
| 7,000,088 | B1 * | 2/2006 | Rudeseal et al. | 711/173 |
| 7,222,223 | B2 * | 5/2007 | Miller et al. | 711/158 |

* cited by examiner

*Primary Examiner*—Sanjiv Shah
*Assistant Examiner*—Daniel Tsui
(74) *Attorney, Agent, or Firm*—BainwoodHuang

(57) ABSTRACT

Storage requests are divided into high-priority requests generally requiring low response time and low-priority requests generally requiring high throughput. The high-priority requests are further divided into several priorities reflecting different classes of service. The low-priority requests are placed on a low-priority request queue where they are executed in a throughput-optimizing order generally different from their arrival order. For each high-priority request, if there are not more than a predetermined number n (e.g., 1) outstanding requests for execution by the disk drive of greater priority, then the request is placed on a high-priority request queue where it is generally executed ahead of requests on the low-priority request queue. If there are more than n such greater-priority requests outstanding, then the high-priority request is placed on the low priority request queue and included in the throughput optimization along with the low-priority requests. The number of priority levels for the high priority requests may be two or more, and in one illustrated embodiment is equal to three.

6 Claims, 6 Drawing Sheets

MANAGEMENT OF TWO-QUEUE REQUEST STRUCTURE FOR QUALITY OF SERVICE IN DISK STORAGE SYSTEMS

BACKGROUND

The present invention is related to the field of data storage systems.

In the field of data storage systems, it is common to maintain a queue of storage requests inside a disk drive. Beyond its inherent effect of buffering the requests to help manage the timing of execution of the requests, a request queue also plays a significant role in achieving optimal performance of disk drives. Due to the nature of the mechanisms for accessing data on a disk drive, the overall performance for a given set of storage requests can vary widely depending on the order in which they are executed. If the requests are executed in an order that mimics the direction of rotation of the disk and preferred seek patterns, then the overall performance may be quite optimal. If the requests are instead executed in a more random order, significantly lower performance may be obtained. Thus, one important role of request queues in modern storage systems is to store a number of requests that are subject to re-ordering by an optimizing scheduler. In such systems, the request throughput (number of requests per unit time) generally increases as the queue length (number of pending storage requests in the queue) increases up to an asymptotic level.

One drawback of a large request queue in a disk drive, however, is that the response time or access time for the requests is increased. For many types of storage requests, a reasonable amount of increased latency is a small price to pay for the improvement in overall throughput. However, there are some types of requests that are more sensitive to access time. As an example, when a block of data is being read from a storage system that employs caching, it is important in the case of a "miss" (i.e., a failure to find the block in the cache) to retrieve the block from the disk as quickly as possible. With a well-designed cache, the rate of such requests is generally low, and therefore the storage system performance is not particularly sensitive to the throughput of such requests. Rather, these requests require execution by the disk drive in the minimum amount of elapsed time. In the description herein, requests that require low access time are referred to as "high-priority" or HP requests, in contrast to relatively "low-priority" or LP requests for which throughput is a more important performance parameter.

Disk drives have been known to employ two separate queues in order to improve the access time experienced by high-priority requests when an optimizing scheduler is employed to improve overall throughput. The optimizing scheduler looks at requests in the high priority queue and schedules the most appropriate storage request from that queue. If the high priority queue is empty, then it schedules the most appropriate storage request from the low priority queue. Such a configuration is effective in servicing storage requests from the high priority queue ahead of the storage requests in low priority queue.

SUMMARY

There is an increasing trend in the data storage industry toward providing performance-differentiated storage services, generally referred to under the label of "quality of service" or QOS. As one tool in providing such differentiated services, storage vendors can implement different priorities that can be assigned to the storage requests of different customers or different classes of storage traffic. Under such an approach the disk drive needs to differentiate among storage requests of different QOS levels, while also distinguishing between "high-priority" and "low-priority" requests according to the above definitions.

To address these goals, a method is disclosed for managing the queuing of storage requests to a disk drive, the storage requests being divided into high-priority requests that generally requiring low response time and low-priority requests that generally require high throughput. The high-priority requests are further divided into a number of priorities reflecting different classes of service.

The method includes placing each low-priority request on a low-priority request queue which is the subject of throughput optimization by which requests on the low-priority request queue are executed in a throughput-optimizing order generally different from the order in which the requests are placed on the low-priority request queue.

For each high-priority request, it is determined whether there are more than a predetermined number n requests outstanding for execution by the disk drive having priority greater than the priority of the high priority request. If there are not more than n such outstanding requests, then the high-priority request is placed on a high-priority request queue which is the subject of priority selection such that requests on the high-priority request queue are executed by the disk drive ahead of requests on the low-priority request queue.

If it is determined that there are more than n such greater-priority requests outstanding, then the high-priority request is placed on the low-priority request queue instead of the high-priority request queue. The high-priority request is included in the throughput optimization along with the low-priority requests on the low-priority request queue. Thus, the multiple-priority service scheme is realized by selective use of the low-priority queue for new high priority requests whose priority levels are lower than the priority level(s) of outstanding high-priority request(s).

In one embodiment, the number n is equal to one. The number of priority levels for the high priority requests may be two or more, and in one illustrated embodiment is equal to three. When the single low-priority request type is added, a four-level priority scheme is realized.

The method is disclosed in the context of an integrated cache-disk array (ICDA) but can be used more generally in systems having a single initiator of storage requests and a disk drive using high- and low-priority queues.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
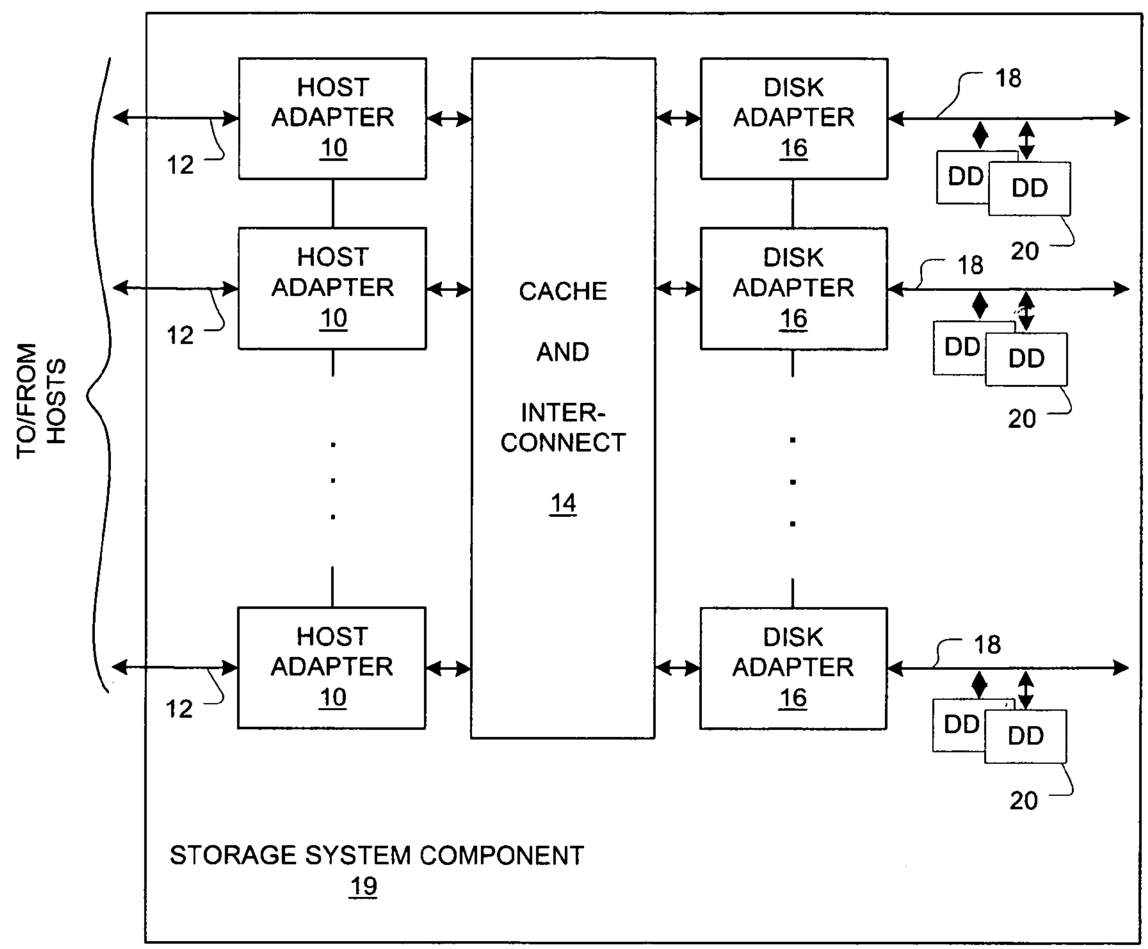
FIG. 1 is a block diagram of a data storage system incorporating disk queue management in accordance with the present invention.

FIG. 1 shows a data storage system for storing data for a number of host computers (or simply hosts). The host computers are coupled to respective host adapters 10 via respective interconnect buses 12, such as Fiber Channel or other high-speed storage interconnect buses. The host adapters 10 are coupled to cache and interconnect block 14, which in turn is coupled to disk adapters 16. Each disk adapter 16 interfaces to one or more storage buses 18 to which a plurality of disk drives (DD) 20 are connected. The storage buses 18 may be Small Computer System Interconnect (SCSI) buses for example. In the illustrated embodiment, the above-described components are part of a storage system component 19 that may include a distinct physical housing. An example of such a storage system component is a Symmetrix® storage system sold by EMC Corporation.

Figure 2:
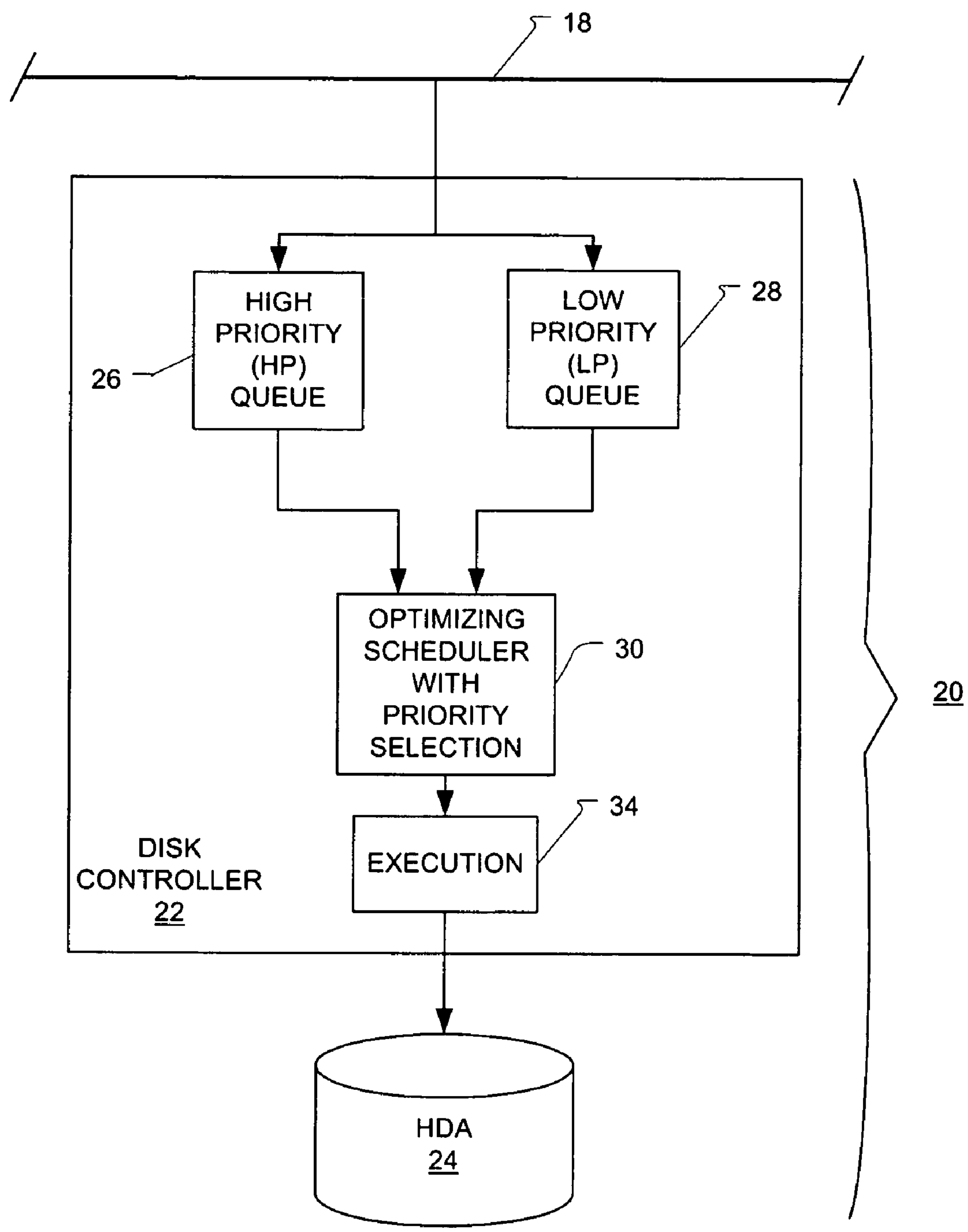
FIG. 2 is a block diagram of a disk drive in the data storage system of FIG. 1.

FIG. 2 shows the pertinent details of a disk drive 20, which includes a disk controller 22 and a head-disk assembly (HDA) 24. The details of the HDA 24 have been omitted for clarity, but generally it includes a magnetic disk on which information is stored, a read/write head assembly that moves a magnetic transducer over the surface of the disk to read and write data at selected locations, motors and positioning elements for the disk and read/write head assembly, and other related electromechanical components as generally known in the art. Some HDAs may incorporate multiple disks and read/write head assemblies for greater storage capacity. The disk controller 22 implements the electrical circuitry for interfacing to the storage bus 18 and the HDA 24 and for controlling the transfer of data therebetween, as well as other related functions such as initialization, configuration, and diagnostics, as is also generally known in the art. As shown in FIG. 2, the disk controller 22 includes a high-priority (HP) queue 26 and a low-priority (LP) queue 28, as well as an optimizing scheduler 30 and request execution logic 34. The optimizing scheduler 30 includes priority selection functionality by which it first examines the HP queue 26 for a request to execute before executing any pending requests on the LP queue 28. These various components are involved with receiving and executing storage requests sent to the disk drive 20 by the respective disk adapter 16 of FIG. 1, as described in more detail below.

The HP queue 26 and LP queue 28 provide separate paths by which a storage request received by the disk controller 22 is provided to the request execution logic 34 for execution. Generally speaking, high-priority requests require minimal access time, i.e., minimal overall delay from the receipt of such a request to the completion of the request, whether that is returning read data from the disk or writing data to the disk. Examples of high-priority requests in the storage system component 19 (FIG. 1) include prefetch reads and "read misses", i.e., read requests for data that has been requested by a host but not found in the cache memory within the cache and interconnect block 14. Similarly, so-called "destage writes" of data from the cache memory to the disk can become high-priority when there is a lot of data to be written to the disk (at which point the system enters a high priority destage mode). Examples of low-priority requests include various RAID-related requests, data scrubbing operations, etc.

Thus, the priority selection logic within the optimizing scheduler 30 operates to select a request from the HP queue 26 when one or more requests are present, and only selects a request from the LP queue 28 when the HP queue 26 is empty. By this mechanism, the high-priority requests are given the best. (i.e. minimal) access time or response time possible. However, under some conditions this type of operation can actually be counterproductive, so the disk adapter 16 actively manages its use of the HP queue 26 and LP queue 28 as described below in response to operating conditions.

One known effect of the optimizing scheduler 30 is as follows. When the average number of storage requests in a disk queue is low, for example one, the disk drive 20 is capable of executing a relatively low number of storage requests per unit time, referred to as "I/Os per sec." (i.e., input/output operations per second). When there are more entries in the queue on average, the disk drive 20 can execute a greater number of storage requests per second. This phenomenon is due to the nature of disk access. A series of sequentially located disk blocks can be accessed relatively quickly, whereas accessing a set of randomly located disk blocks is much more inefficient and slower. When there are more requests in the queue, the requests can be re-ordered to increase the sequentially of the pattern of disk blocks being accessed. When there are fewer requests in the queue, there is less potential for such optimizing re-ordering.

Beyond the high-priority/low-priority distinction as discussed above, there is a growing need in the storage field to provide so-called "differentiated services" to storage customers, these also being referred to by the term "quality of service". It may be desirable, for example, to provide multiple classes of storage services that have corresponding cost characteristics, so as to increase revenue and/or realize a more desirable allocation of storage resources among a set of competing users. Thus, in addition to the high-priority/low-priority distinction as described above, the storage system may further differentiate the requests of different storage users into different classes from a quality of service perspective. In practice, the storage system may implement such a differentiation as a set of relative priorities among the classes, such that if two requests contend for the same storage resource at the same time, access is first granted to the request having the higher priority. Generally speaking, such a priority scheme should offer the best overall performance to the highest-priority users, and gradually decreasing levels of performance to successively lower-priority users.

It may further be desirable, for reasons of compatibility for example, for a storage system to support a prioritization of storage users while also employing a two-queue structure (high-priority and low-priority) of the type described above. The two-queue structure may be a relatively unchangeable hardware feature, for example, while a quality-of-service regime may have a more variable or changeable characteristic such that specific hardware support is not warranted. In such a case, it may be desirable to utilize the two-queue structure in a specific way that provides support for a multiple-level quality-of-service storage scheme.

Figure 3:
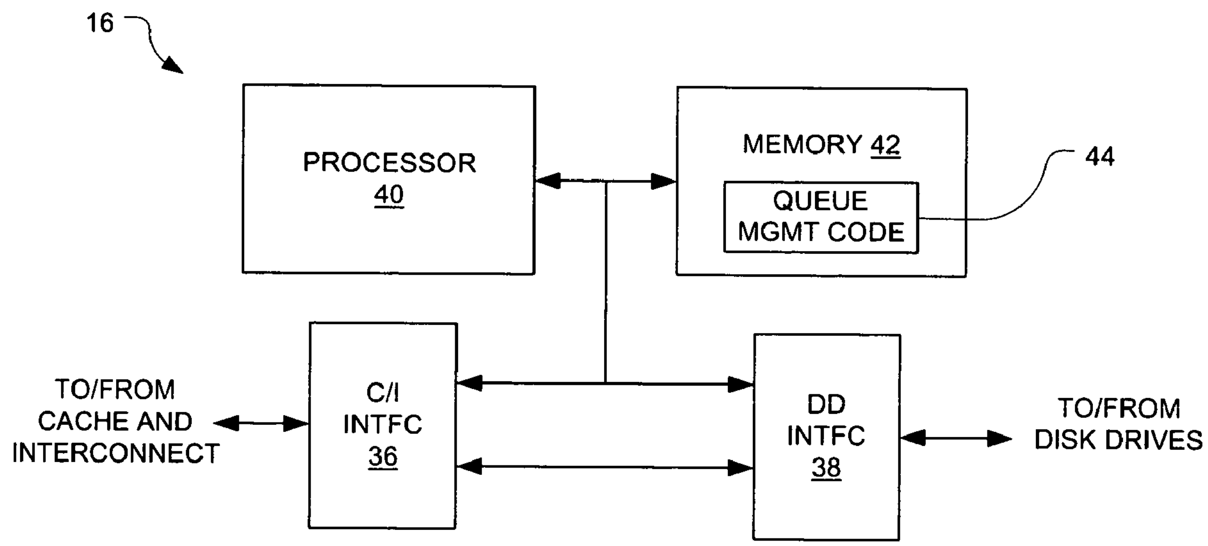
FIG. 3 is a block diagram of a disk adapter for a set of disk drives in the data storage system of FIG. 1.

FIG. 3 shows the organization of a disk adapter 16 that implements a multiple-priority quality-of-service scheme using the two-queue structure of FIG. 2. The primary datapath is provided by cache/interconnect (C/I) interface logic 36 and disk drive (DD) interface logic 38. A processor 40 and associated memory 42 provide control functionality. In particular, the memory 42 includes queue management code 44 that is executed by the processor 40 as a queue management process for managing the use of the HP queue 26 and LP queue 28 of the disk controller 22 (FIG. 2). As described below, the queue management process effects the above-referenced multiple-priority, quality-of-service scheme using a two-queue structure such as shown in FIG. 2.

Figure 4:
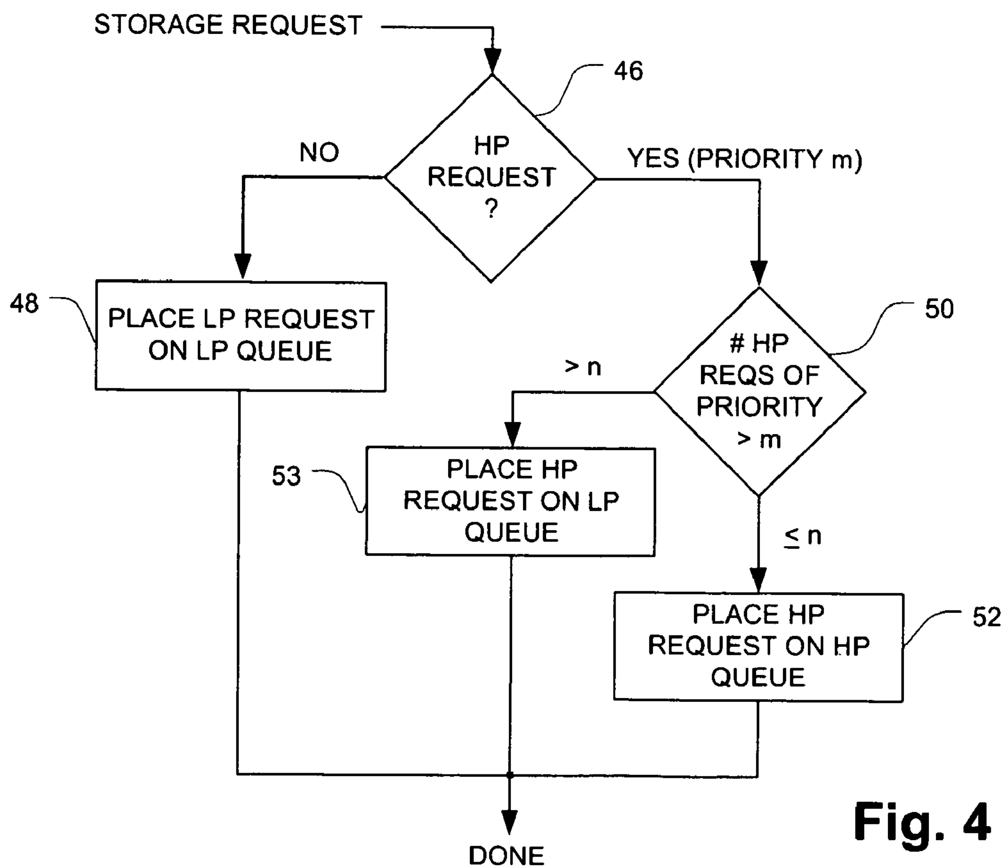
FIG. 4 is a flow diagram of a queue management method performed by the disk adapter of FIG. 3 for managing queues of storage requests in the disk drive of FIG. 2.

FIG. 4 illustrates the queue management process. Upon receiving a storage request via the cache and interconnect block 14 (FIG. 1) and the C/I interface logic 36 (FIG. 3), the processor 40 first determines at step 46 whether the storage request is an HP request. The classification of request types as HP or LP is described above. If the request is not an HP request, then at step 48 the request is placed on the LP queue 28 as an LP request. If at step 46 the processor 40 determines that the storage request is an HP request, it proceeds to step 50.

It is assumed that the HP request has a priority "m" in a multiple-level priority scheme. For example, in one embodiment, the storage system may support four priority levels, which may be identified as priorities 3 through 0, with priority 3 being the highest priority and successively lower numbers representing successively lower priorities. In such a case, $3 \geqq m \geqq 0$. In alternative embodiments, there may be more or fewer priority levels. It will be appreciated that the priority levels generally correspond to different classes of service that the storage system may provide to system users. In the present description, the lowest priority "0" is equivalent to a "low-priority" request as discussed above, i.e., RAID requests, data scrubbing, etc. Higher-numbered priorities are assigned to the above-described "high-priority" requests (read misses etc.) of different quality-of-service classes. Thus, in a system having four priorities 0 through 3, there are three "high" priorities 1 through 3.

There is not necessarily a one-to-one correspondence between service classes and priorities. The system may utilize a set of P priority levels on a dynamic basis as a means of implementing a quality-of-service scheme having S service levels, where P may be different from (generally less than) S. It is assumed in the present description when a request is received by the disk adapter 16 that a priority level has already been assigned to it, for example by a host adapter 10 that generates the request.

Referring again to FIG. 4, at step 50 the processor 40 determines how many high-priority storage requests having a priority higher than m are currently outstanding, i.e., have been issued to the disk drive 20 to which the current request is directed. If that number is less than or equal to a predetermined constant n, then at step 52 the processor 40 places the HP request on the HP queue 26. As described above, the priority selection function of the optimizing scheduler 30 ensures that the HP request is executed ahead of any requests in the LP queue 28 to minimize the response time for the HP request.

If at step 50 the processor 40 determines that more than n requests of higher priority than the current request are outstanding, then at step 53 the HP request is placed on the LP queue 28 instead of the HP queue 26. Once this has occurred, the HP request is treated by the disk controller 22 the same as the LP requests in the LP queue 28. In particular, the optimizing scheduler 30 includes any HP requests residing in the LP queue 28 in its optimization of the requests in the LP queue 28, such that the HP requests are executed along with the LP requests in a throughput-optimizing order.

It will be appreciated that any HP requests placed on the LP queue 28 effectively lose their high-priority characteristic insofar as requiring a low response time—the optimizing scheduler 30 generally ignores response time as a metric in scheduling the requests in the LP queue 28. The resulting response time penalty is attributable to the priority of the current request relative to the priorities of the outstanding requests. New HP requests are placed on the HP queue 26 only if there are at most n outstanding requests of higher priority.

In general, the number n may be one or some number greater than one. As n gets larger, the service-differentiating effect of the prioritization scheme is diminished. Experimental results indicate that n=1 may be a good choice.

It should also be noted that in step 50 an HP request is deemed to be "outstanding" or "issued" regardless of whether it is on the HP queue 26 or the LP queue 28.

Figure 5:
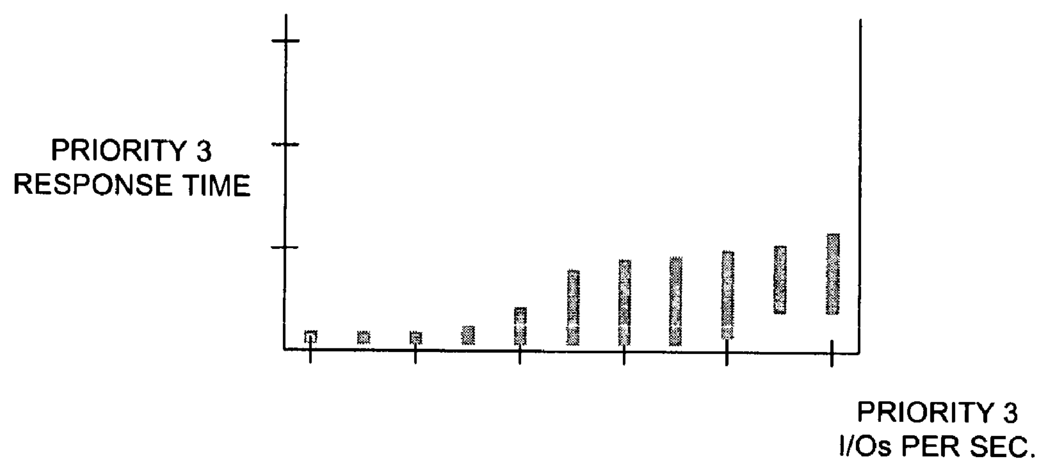
FIGS. 5-8 are plots showing the dependence of throughput and response time on the rate of storage requests in a data storage system employing the queuing technique of FIG. 4.

FIGS. 5-8 illustrate the results of performance simulations using the queuing technique of FIG. 4 in a four-level priority scheme (m in the range of 0 to 3) and n=1. FIG. 5 shows a plot of the response time for priority-3 requests as a function of the rate of priority-3 requests in I/Os per second. It can be seen that for rates up to about 30% of the horizontal scale maximum, the response time is desirably low—about 5% of the vertical scale maximum. For higher request rates, the response time generally rises. The elongated bars indicate a spread or variability of response times for a number of requests. At the very highest request rate (i.e., the right-most bar), the response times vary from about 10% to about 30% of the vertical scale maximum.

Figure 6:
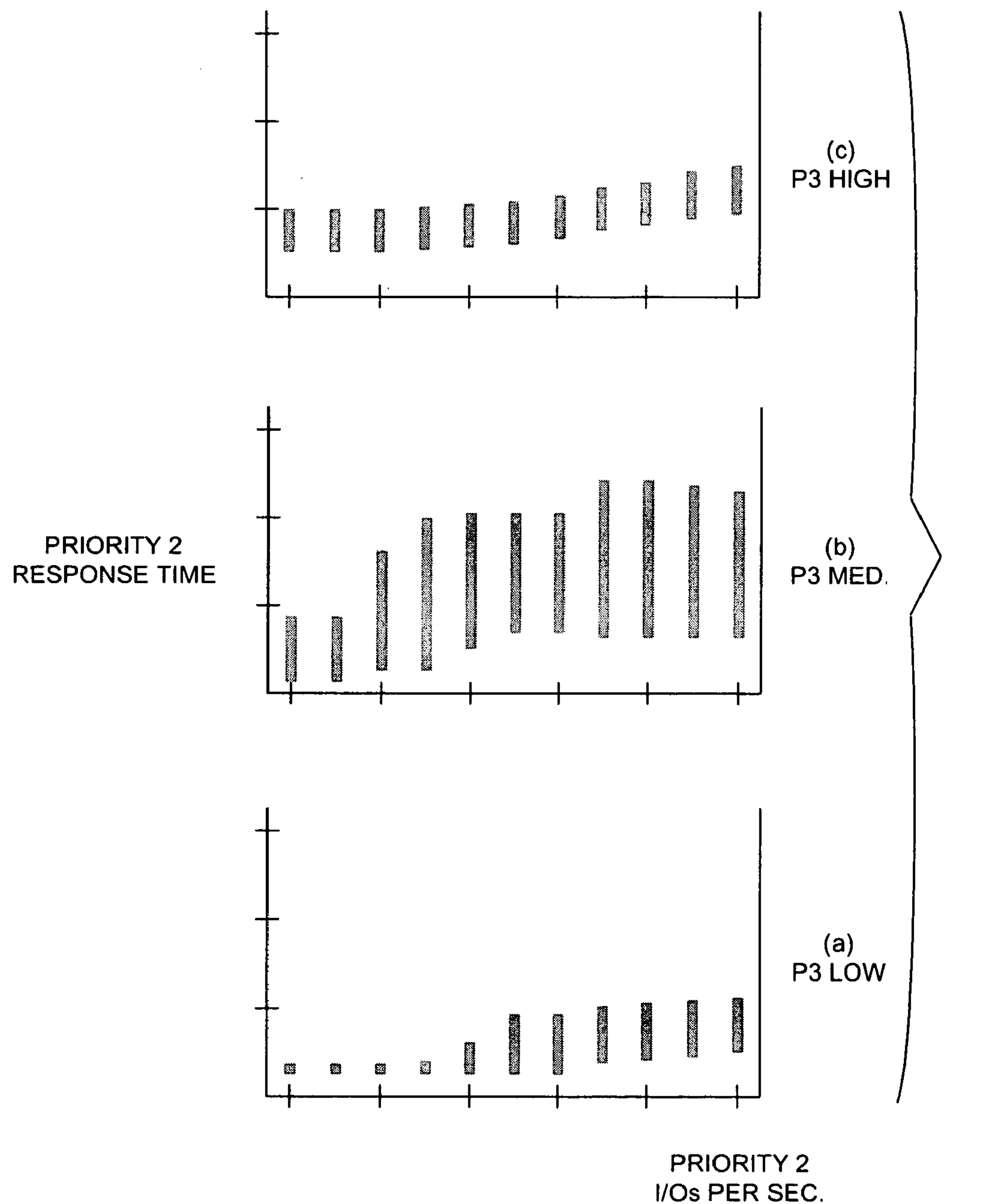

FIG. 6 shows plots of response times for priority-2 requests as a function of the rate of priority-2 requests, for each of three distinct rates of priority-3 (P3) requests—low (plot a), medium (plot b), and high (plot c). Plot (a) shows a similar characteristic to that of FIG. 5, i.e., very small response times at low priority-2 request rates and greater response times at higher rates, with the higher response times being in the range of 10-30% of vertical scale maximum. At the medium priority-3 request rate of plot (b), the priority-2 response times exhibit a much greater range at all priority-2 request rates, and grow more quickly as the priority-2 request rate grows. At the high priority-3 request rate of plot (c), the response times start in the range of 15-30% of scale maximum and grow relatively steadily to about 30-40% of maximum.

It may seem counter-intuitive that the response times at the high priority-3 request rate exhibit less variability than at the medium priority-3 request rate. This behavior occurs due to the higher overall request rate, which tends to cause starvation of the lower-priority requests that are assigned to the LP queue 28. These lower-priority requests time-out and are then moved to the HP queue 26 where they are subsequently serviced, and thus the overall processing tends toward timeout-based scheduling (rather than throughput-optimizing scheduling as discussed above) when starvation is occurring. While the variability of response times decreases, the overall request throughput decreases drastically, as further described below.

Figure 7:
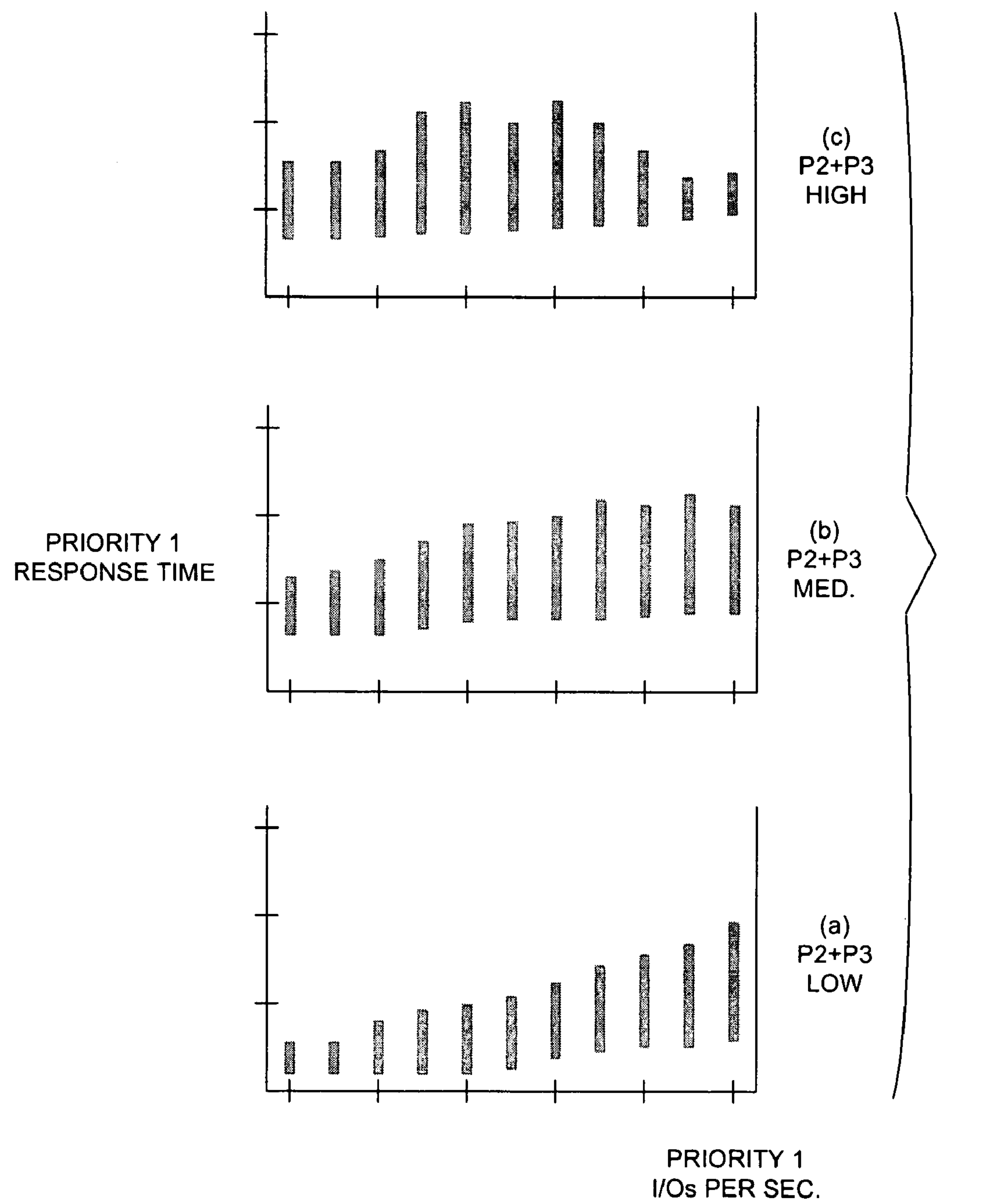

FIG. 7 shows plots of the response time for priority-1 requests as a function of the rate of priority-1 requests, for each of three distinct combined rates (P2+P3) of priority-2 and priority-3 requests—low (plot a), medium (plot b), and high (plot c). These plots exhibit similar trends to those appearing in FIG. 6, but with generally higher response time values. Thus, it will be seen that the priority-1 requests generally experience higher response times than do the priority-2 requests, as would be expected. The relatively high variability exhibited in plot (c) is believed to be a simulation anomaly—it is believed that in practice the response-time variability should be closer to that appearing in FIG. 6(*c*), because of the transition to timeout-based scheduling under these operating circumstances.

Figure 8:
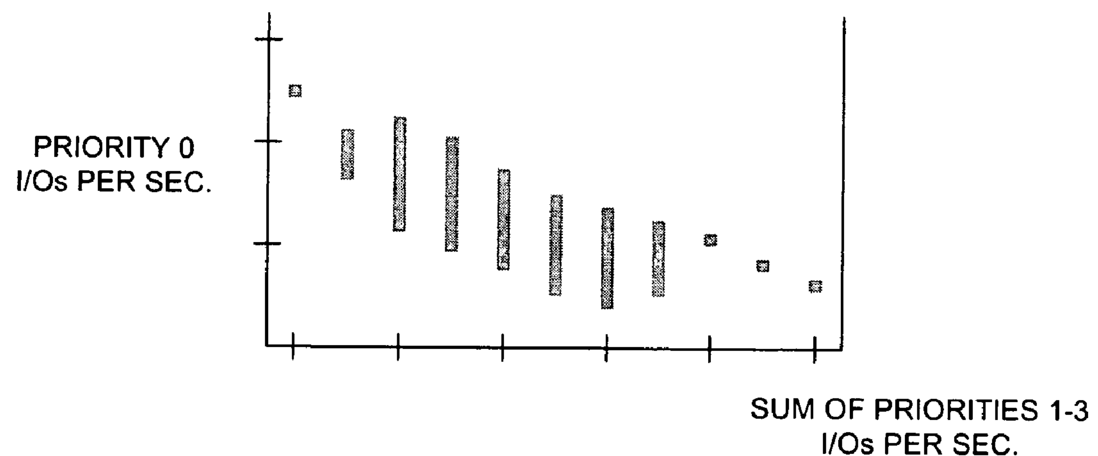

FIG. 8 shows the throughput of priority-0 requests (LP requests) as a function of the combined request rates of priority-1 through priority-3 requests. It will be seen that this value starts relatively high and with low variability, then its value decreases and its variability increases with increasing combined rates of priority-1 through priority-3 requests. At about 75% of the horizontal scale maximum, the variability again becomes very small and the value tails off at about 20% of vertical scale maximum.

It is to be understood that the present invention may be embodied in a processor such as the processor 40 with associated memory 42 loaded with queue management code that, when loaded into the memory and executed by the processor, causes the processor to implement the functionality described and claimed herein. It also may be embodied in a computer-readable medium on which such code is stored in a non-volatile manner, for loading into processor memory and execution. In alternative embodiments, the functionality described herein may be executed in whole or part by lower-level control logic such as commonly found in field-programmable gate arrays (FPGAs) and similar logic elements.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A method of managing the queuing of storage requests to a disk drive, the storage requests being divided into high-priority requests and low-priority requests, the high-priority requests generally requiring low response time and the low-priority requests generally requiring high throughput, the high-priority requests being divided into a plurality of priorities, the method comprising:

placing each low-priority request on a low-priority request queue, the low-priority request queue being the subject of throughput optimization by which requests on the low-priority request queue are executed by the disk drive in a throughput-optimizing order generally different from the order in which the requests are placed on the low-priority request queue; and for each high-priority request:

(i) determining whether there are more than a predetermined number n outstanding requests for execution by the disk drive having priority greater than the priority of the high priority request;

(ii) if there are not more than n such outstanding requests, then placing the high-priority request on a high-priority request queue, the high-priority request queue being the subject of priority selection such that requests on the high-priority request queue are executed by the disk drive ahead of requests on the low-priority request queue; and (iii) if there are more than n such outstanding requests, then placing the high-priority request on the low priority request queue such that the high-priority request is included in the throughput optimization along with the low-priority requests on the low-priority request queue.

2. A method according to claim 1, wherein the predetermined number n is equal to one.

3. A method according to claim 1, wherein the number of priorities of the high-priority requests is three.

4. A disk drive adapter for use with a disk drive in a storage system, the disk drive adapter including a processor, memory, and interface logic coupled to the disk drive, the memory being operative to store queue management code, the queue management code being operative when executed by the processor cause the processor to perform the steps of:

placing each low-priority request on a low-priority request queue, the low-priority request queue being the subject of throughput optimization by which requests on the low-priority request queue are executed by the disk drive in a throughput-optimizing order generally different from the order in which the requests are placed on the low-priority request queue; and for each high-priority request:

(i) determining whether there are more than a predetermined number n outstanding requests for execution by the disk drive having priority greater than the priority of the high priority request;

(ii) if there are not more than n such outstanding requests, then placing the high-priority request on a high-priority request queue, the high-priority request queue being the subject of priority selection such that requests on the high-priority request queue are executed by the disk drive ahead of requests on the low-priority request queue; and (iii) if there are more than n such outstanding requests, then placing the high-priority request on the low priority request queue such that the high-priority request is included in the throughput optimization along with the low-priority requests on the low-priority request queue.

5. A disk drive adapter according to claim 4, wherein the predetermined number n is equal to one.

6. A disk drive adapter according to claim 4, wherein the number of priorities of the high-priority requests is three.

* * * * *